United States Patent [19]

Lubinsky et al.

[11] Patent Number: 4,827,279

[45] Date of Patent: May 2, 1989

[54] PROCESS FOR CORRECTING ACROSS-THE-HEAD NONUNIFORMITY IN THERMAL PRINTERS

[75] Inventors: Anthony R. Lubinsky, Webster; James F. Schmitt, Fairport; Ann K. Pillman, Rochester, all of N.Y.

[73] Assignee: Eastman Kodak Company, Rochester, N.Y.

[21] Appl. No.: 207,565

[22] Filed: Jun. 16, 1988

[51] Int. Cl.⁴ .......... G01D 15/10

[52] U.S. Cl. .......... 346/1.1; 346/76 PH

[58] Field of Search .......... 346/1.1, 76 PH

[56] References Cited

U.S. PATENT DOCUMENTS

| | | | |
|---|---|---|---|
| 4,284,876 | 8/1981 | Isibashi et al. | 219/216 |
| 4,415,904 | 11/1983 | Inui et al. | 346/1.1 |
| 4,449,136 | 5/1984 | Moriguchi et al. | 346/76 PH |
| 4,536,774 | 8/1985 | Inui et al. | 346/76 PH |
| 4,574,293 | 3/1986 | Inui et al. | 364/76 PH |
| 4,587,530 | 5/1986 | Noguchi | 346/76 PH |
| 4,688,051 | 8/1987 | Kawakami et al. | 346/76 PH |

FOREIGN PATENT DOCUMENTS

| | | |
|---|---|---|
| 0194874 | 11/1984 | Japan . |
| 0072757 | 4/1985 | Japan . |
| 0090780 | 5/1985 | Japan . |

*Primary Examiner*—E. A. Goldberg
*Assistant Examiner*—Gerald E. Preston
*Attorney, Agent, or Firm*—Edward Dugas

[57] ABSTRACT

A method and apparatus of the present invention corrects the nonuniformity in the printing density between the printing elements of a thermal print head by first printing across a transparent receiver with each element of the head activated with equal inputs (flat field). The print transmittance values are read from the transparent receiver using, for example, a microdensitometer, and an adjustment factor for each heating element is computed and maintained in storage to be combined with the number of heating pulses assigned to each of the respective heating elements as they perform their normal printing function.

7 Claims, 4 Drawing Sheets

PROCESS FOR CORRECTING ACROSS-THE-HEAD NONUNIFORMITY IN THERMAL PRINTERS

TECHNICAL FIELD OF THE INVENTION

The present invention relates to the field of thermal printing and more particularly to a process for improving the uniformity of printing by a thermal print head.

BACKGROUND OF THE INVENTION

One method of printing continuous tone images makes use of a thermal print head, heat sensitive media and a means for moving the media relative to the thermal head. Most thermal print heads are a one-dimensional array of heating elements (often with integral driver IC's and shift registers) mounted on a ceramic substrate. The ceramic substrate is then mounted to a heat sink which may be metal. In systems utilizing this type of thermal print head it is often observed that the printing density is not uniform across the page, but rather that lines, streaks, and bands are visible in the direction parallel to the page motion. This nonuniformity occurs even when the input to the thermal head represents a constant (flat) field. Further, it is often observed that the size of the density nonuniformities varies with the amount of heating.

It has been found that the observed lines and bands can arise from several causes including variations in the resistance of the heater elements, variations in the thermal or mechanical contact between the thermal head and the media, and variations in the thermal contact between the ceramic base of the head assembly and the heat sink.

A particular patent of interest for its teaching in this technical art is U.S. Pat. No. 4,688,051 entitled "Thermal Print Head Driving System" by T. Kawakami et al. The system of that patent supplies a predetermined number of driving pulses to each of a plurality of heat-producing elements arranged in a line. The pulse width of the drive pulses are controlled in accordance with the temperature at, or in the vicinity of, the heat-producing elements. This control maintains the density level of like tones at a substantially constant value. Also, in one aspect of that invention the number of driving pulses, corresponding to a desired tone level, is altered in consideration of data collected from at least one of the preceding recording lines.

Another patent of interest is Japanese Pat. No. 59-194874 entitled "Thermal Head Driver" by Mamoru Itou. The driver of that patent strives for a uniform printing density by controlling the spacing between constant pulse width current signals that are applied to heating resistors with the space between the pulses varying in accordance with the temperature of a substrate that forms part of the thermal head. In this manner, as the temperature of the thermal print head increases the space between successive pulses is also increased due to the fact that less energy is needed to bring the heating elements up to a recording temperature. In a like manner, if the temperature of the head decreases the space between pulses is decreased in order to provide more heating energy to the heating elements.

Another patent of interest is Japanese Pat. No. 60-72757 entitled "Thermal Recorder" by Kazushi Nagato. The recorder of that invention attempts to unify the image density in a screen of thermal printing by counting the number of lines from the starting point of printing to control the energized pulse width according to the line count. This technique counteracts the effect of having a cold head when the first lines of the image are being recorded versus having an extremely warm or hot head as the printer approaches the end of the page after having recorded many lines of image data.

Another patent of interest is Japanese Pat. No. 60-90780 entitled "Thermal Printer" by Nobuaki Aoki. In that patent, printing pulses are controlled as a function of the number of pieces of data printed and the period of time corresponding to the printing. The system of that patent more specifically counts dot data for controlling the printing pulses during the printing of one piece of data and a timer counts the period of time elapsed between the end of printing of a first document and the start of printing for a subsequent document. The duration of time between printings is related to the cooling effect that will occur in a thermal print head. This cooling effect will of course, if left uncompensated, cause a variance in the print density at the start of printing of the next image in the sequence.

From the foregoing it can be seen that control of the density of thermal printers is a problem that has been approached in a number of ways with the desired results being a uniform density across a printed page of data. The present invention is directed towards a solution to that problem.

SUMMARY OF THE INVENTION

The method and apparatus of the present invention corrects the across the head nonuniformity in a thermal print head by initially printing on a transparent receiver with the thermal print head a flat field using equal and constant inputs to each of the heating elements forming the thermal print as the print head is moved across the transparent receiver. A microdensitometer, for example, is used to measure the transmittance values of the transparent receiver in areas associated with each of the heating elements across the length of the transparent receiver. Digital values derived from the measured transmittance values are stored for use to adjust the number of heating pulses that are applied to each of the heating elements in normal usage so as to either add or subtract a number of heating pulses to each of the heating elements in order to maintain a uniform output density from each of the elements, across the printing range of the thermal print head. In accordance with one aspect of the invention a density-dependent correction to the number of heat pulses applied to each of the heating elements is calculated from the following formula:

$$C_i = \left(\frac{D_i - D_{aim}}{\gamma}\right)\left(\frac{N_i}{N_m}\right)$$

and the number of heat pulses given to each element i is adjusted according to:

$$\tilde{N}_i = N_i - C_i$$

where:

$D_i$ is the measured density for heater i;

$D_{aim}$ is the aim density;

$N_i$ is the uncorrected number of heat pulses to heater i;

$\tilde{N}_i$ is the corrected number of heat pulses to heater i;

$N_m$ is the number of pulses at which the original density is measured; and $\gamma$ is an adjustable parameter.

From the foregoing it can be seen that it is a primary object of the present invention to correct the across-the-head nonuniformities in a thermal printer.

It is a further object of the present invention to provide a correcting process for thermal print heads.

These and other objects of the present invention will become more apparent when taken in conjunction with the following description and drawings wherein like characters indicate like parts and which drawings form a part of the present application.

DESCRIPTION OF THE PREFERRED EMBODIMENT

Figure 1:
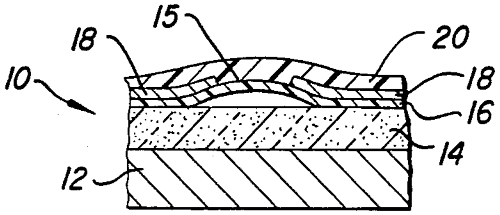
FIG. 1 is a cut-away sectioned view of a printing element from a one-dimensional thermal head array.

Referring to FIG. 1, a section of a printing element of the type used in a one-dimensional array thermal head 10 is shown comprised in part of a heat sink 12 onto which is fixed and/or deposited a ceramic layer 14. A resistance heating element 16 is positioned on the ceramic material 14 with a projecting section 15. Deposited onto the resistance element is a pair of conductors 18 which transmit current pulses to the resistance element 16 to heat the resistance element in the area of the projection 15. A protective layer 20 is deposited onto the conductor 18 and the projecting portion 15 of the resistance element 16 to provide a wear surface that protects the resistor 16 and conductors 18. The one-dimensional array is formed by positioning a number of the heating elements 10, onto a head structure. Each of the heating elements may be independently selected to be heated in order to print an element of an image.

Figure 2:
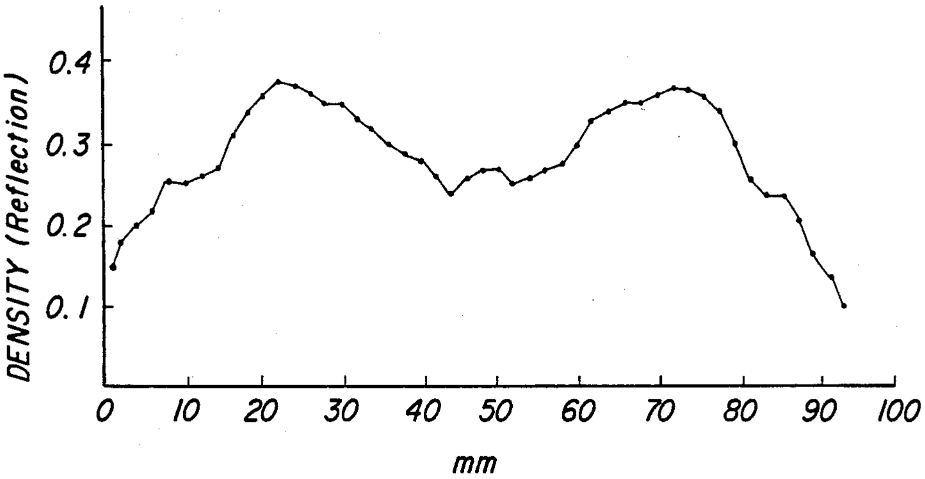
FIG. 2 is a chart illustrating the variance in printing density across a page of print.

Referring now to FIG. 2, the curve shown therein illustrates the change in density from one position to another across the width of a print head for identical inputs (flat field). This variance occurs even though the inputs are identical, that is, all of the heating elements are on and heating in response to the same constant input.

Figure 3:
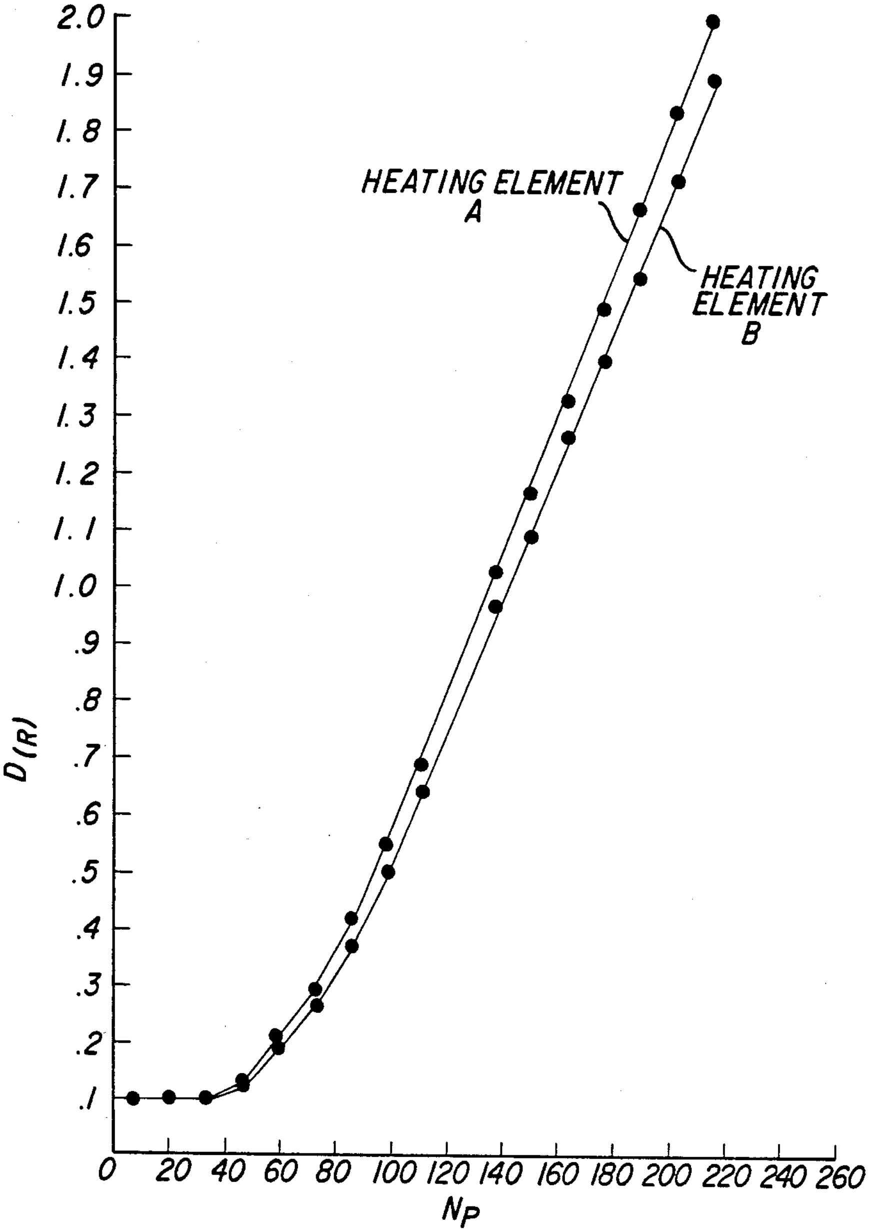
FIG. 3 is a graph illustrating the density produced by two different heating elements of the same thermal print head as a function of a number of heat pulses applied to each of the heating elements.

Referring to FIG. 3, shown therein the graph further illustrates the density differential for similarly constructed heating elements contained within one thermal head. As can be seen, there is a variance between the density output created by heating element A versus the density output created by heating element B with both of the heating elements receiving pulses of equal type at the same time, and the density variance increases as the number of pulses applied to each increases.

Figure 4:
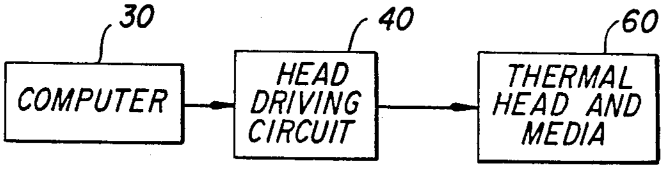
FIG. 4 is a block diagram of the apparatus used for implementing the method of the present invention.

In FIG. 4 the apparatus for implementing the method of the present invention is illustrated in block diagram form comprised of computer 30, head driving circuitry 40 and the thermal head and media 60.

Figure 5:
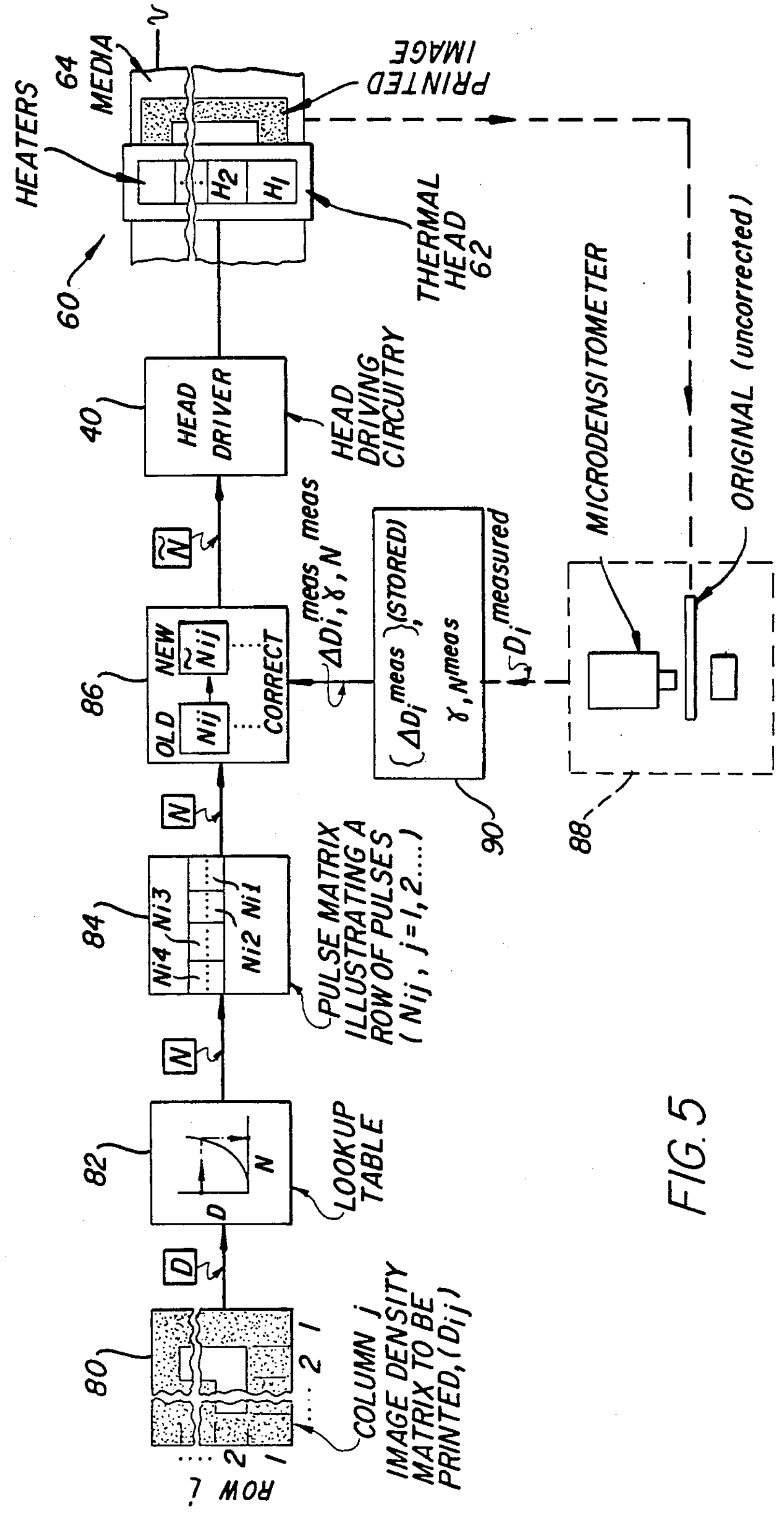
FIG. 5 is a detailed block diagram illustrating the steps of the process of the present invention.

In FIG. 5, there is illustrated a detailed hybrid block diagram of the steps of the method of the present invention incorporating blocks representing the apparatus of FIG. 4.

The first step of the method is to make a clean "flat" field on a transparent receiver (media) 64. This is accomplished by providing each of the heating elements Hi in the thermal head 62 with a constant group of pulses from a head driver circuit 40. The transparent media 64 is then processed by a microdensitometer 88 as indicated by the dotted line. The microdensitometer measures the transmittance versus position across the head length direction. In the preferred embodiment, the scanning aperture size was $50\mu \times 400\mu$ (the shorter dimension being in the head length direction), with a step size of $25\mu$ and the number of lines of data was varied. The output from the microdensitometer 88 is a plurality of transmittance measurements $T_n$. From the measured transmittance data a set of transmittance values, with synthesized apertures of variable width and length, spaced at the pixel pitch, and centered at the heater centerlines, $T_i$, was formed. This set of transmittance (or density, where density $D_i = -\log T_i$) values correspond to each individual heater. From the transmittance (density) values a correction was made to the number of pulses to be applied to each heater in order to improve the uniformity.

A preliminary experiment checked the sensitivity to x (along head length) and y aperture size and registration, for both transmission and reflection output prints. The thermal head used had 8 heaters/mm., corresponding to a pixel pitch of $125\mu$. For transmission prints on a view-box, x-apertures of $50\mu$, $100\mu$ and $200\mu$ gave acceptable results, but $400\mu$ and $1000\mu$ were too large to properly correct fine line nonuniformities on the original. For reflection prints, x-apertures up to $400\mu$ where acceptable and $1000\mu$ was too large. There was no effect of increasing the y-aperture from $400\mu$ to $1200\mu$, except that one of the three lines of data had a bad data point which was then visible. A shift in registration of $50\mu$ produced a noticeable effect on transmission prints, but no visible effect on reflection prints.

The first kind of correction tried was a constant offset $C_i = N_i - N_i$; that is, we added (or subtracted) a constant number of pulses, independent of the input level $N_i$, for each heater i:

$$C_i = (D_i - D_{aim})/\gamma \quad (1)$$

We varied $\gamma$ and found that a value near the slope of the macro D versus N curve at the measured density gave the best results. We found that flat fields on reflection prints, when corrected, were generally free of any visible lines or bands at the measured density. Transmission prints near the measured density were free of banding when viewed on an overhead projector. It was possible, however, to detect some remaining lines and bands when viewing corrected transmission prints on a viewbox.

When the constant offset correction was tried at a much higher density than the density measured on the original, however, it was found that the output print was undercorrected and that lines and bands still remained. This led to a second, and improved, kind of correction, the "density-dependent" offset. In this scheme the size of the pulse correction $C_i$ was varied linearly with the input number of pulses $N_i$ (and kept equal to its constant offset value at the measured density):

$$C_i=[(D_i-D_{aim})/\gamma]\times[(N_i-N_o)/(N_m-N_o)] \quad (2)$$

where $N_m$ was the number of pulses at which the density on the original was measured, and the intercept $N_o$ was varied. The value of $N_o$ which was found to give the best results was zero. In this case the banding on reflection prints near the measured density was not visible, and the banding at other densities was considerably improved, although not completely eliminated. In general, the reduction in banding over a wide density range was visually more satisfactory for reflection prints than for transmission prints on a view box.

As another method of achieving a good correction over a wide density range, yet another scheme was tried, the "two-point" correction. In this scheme two sets of microdensitometer measurements were made, for both low and high density "flat" fields. Given two measurements, the two parameters in a linear, density-dependent correction could be calculated for each heater individually:

$$\widetilde{N}_i=a_iN_i+b_i \quad (3)$$

where;

$N_i$ is the uncorrected number of heat pulses to heater i;

$\widetilde{N}_i$ is the corrected number of heat pulses to heater i; and the parameters $a_i$, $b_i$ are obtained from the measured densities by the equations:

$$a_i = 1 - \left[\frac{\Delta_{ih} - \Delta_{il}}{D_{ih} - D_{il}}\right] \quad (4)$$

$$b_i = \frac{N_l\Delta_{ih} - N_h\Delta_{il}}{D_{ih} - D_{il}} \quad (5)$$

where:

$D_h^{aim}$ is the aim, high density;

$D_1^{aim}$ is the aim, low density;

$D_{ih}$ is the measured, high density for heater i, at $N=N_h$;

$D_{il}$ is the measured, low density for heater i, at $N=N_1$;

$\Delta_{ih}=D_{ih}-D_h^{aim}$ $\Delta_{il}=D_{il}-D_1^{aim}$

We found, perhaps surprisingly, that the overall performance of the two-point correction over a wide density range was not any better than the best density-dependent offset correction, which was based on a single set of microdensitometer measurements.

Thus, in the preferred embodiment the pulse correction $C_i$ was calculated from a single set of density measurements, as in equation (2), with the offset $N_o$ set equal to zero j; that is, $$C_i = \left(\frac{D_i - D_{aim}}{\gamma}\right)\left(\frac{N_i}{N_m}\right)$$

With the values stored in 90 the system is ready to perform the steps of correcting an input image. The input image is depicted as image 80 containing an image density matrix which is to be printed having pixel elements corresponding to densities $D_{ij}$. These elements are directed to a look-up table 82 which correlates the density to the number $N_{ij}$ which number is the uncorrected number of pulses to be used to drive each heating element Hi in the thermal print head 62. In block 84 there is illustrated a pulse matrix comprised of rows of pulses $N_{ij}$, with i denoting the particular heating element and j denoting the line of the image to be printed. The output from the pulse matrix is thus a string of pulses corresponding to the density to be printed in each pixel. These pulses are corrected by correlating each of the strings of pulses and their position to the density correcting factor called forth from the storage means 90. The corrected number of pulses is then denoted $N_{ij}$. The corrected pulses are then directed to the head driver 40 for energizing the thermal heating elements within the thermal head 62 with the corrected number of driving pulses.

Figure 6:
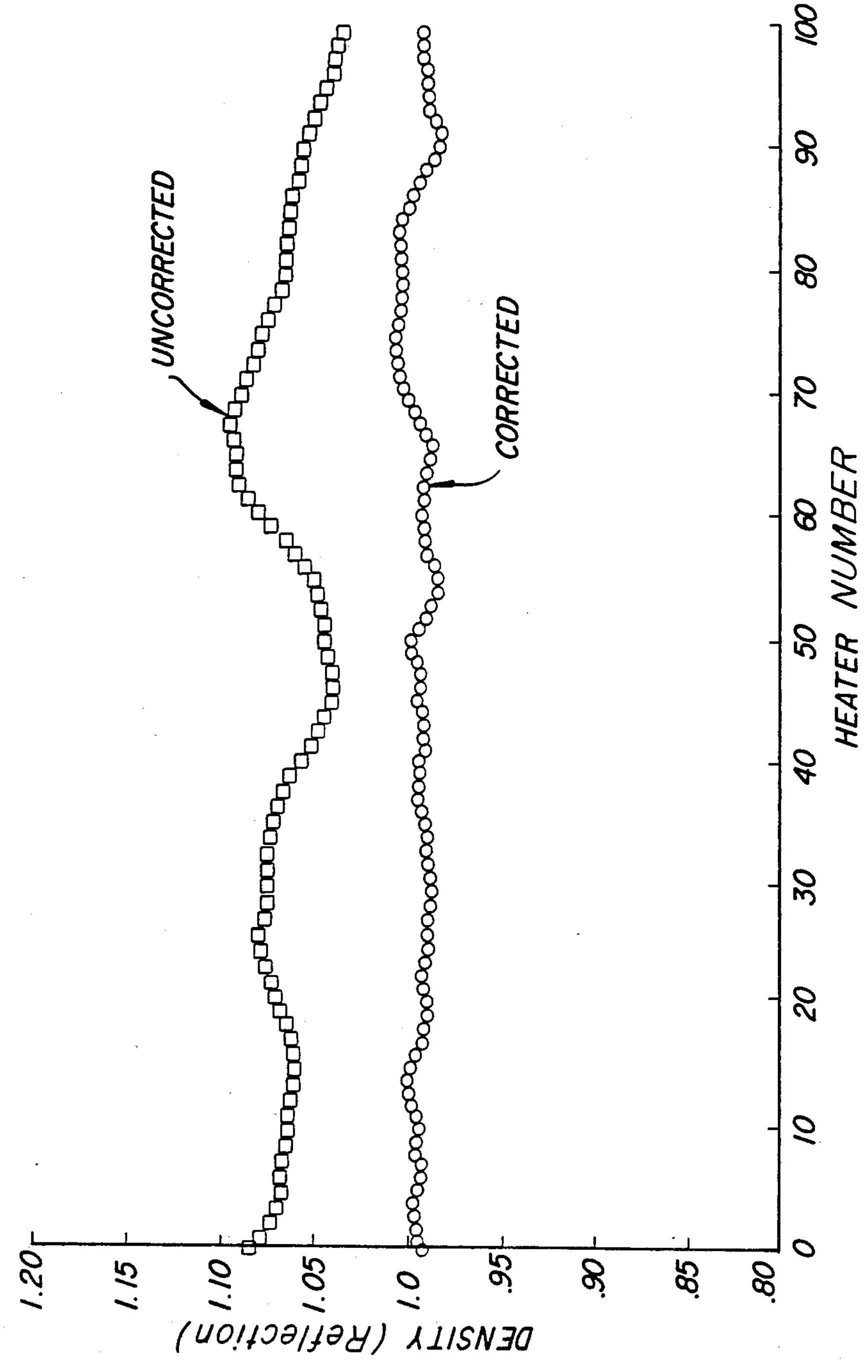
FIG. 6 is a graph illustrating the printed density of an uncorrected heat print across a page and a corrected heat print across a page.

Referring now to FIG. 6, which illustrates the printing output density, across a page of media, with an uncorrected number of pulses versus a corrected number of pulses given to each heating element. Note that for the corrected value an aim density near 1.00 is achieved for many more heating elements than for an uncorrected number of pulses.

While there has been shown what is considered to be the preferred embodiment of the invention, it will be manifest that many changes and modifications may be made therein without departing from the essential spirit of the invention. It is intended, therefore, in the annexed claims to cover all such changes and modifications as may fall within the true scope of the invention.

We claim:

1. A method for correcting across-the-head nonuniformity in the printing of a multiheating element thermal print head comprising the steps of:

(a) printing with each of the heating element thermal print heads energized with equal inputs;

(b) determining the differences in density of the printing performed by each heating element from a desired density; and (c) adjusting the input to each heating element having a determined difference by its associated difference factor to cause all of the heating elements to provide the same density of print when receiving the same input signal.

2. The method according to claim 1 and further comprising the steps of:

(a) addressably storing each of said difference factors; and (b) combining the associated stored difference factor with the input signal for each heating element.

3. The method according to claim 1 wherein said inputs and said difference factors are connected to corresponding pulse signals.

4. A method for correcting acorss-the-head nonuniformity in a thermal print head comprising the steps of:

(a) printing on a transparent receiver with the thermal print head a field using constant equal inputs to each heating element forming the thermal print head;

(b) measuring the transmittance values of the print on the transparent receiver in areas corresponding to each heating element; and (c) adjusting the number of heating pulses applied to each heating element as a function of the logarithm of the transmittance measured in step (b) so as to maintain the printing density of the thermal print head substantially constant for equal inputs.

5. A method for correcting across-the-head nonuniformity in a thermal printer comprising the steps of:

(a) printing on a transparent receiver with a thermal print head an input field utilizing equal inputs to the thermal print head;

(b) measuring the transmittance versus position across the head length direction of the field printed on the transparent receiver;

(c) forming a set of transmittance values with synthesized apertures of variable width and length, spaced at a pixel pitch, and centered at the heater centerlines; and (d) adjusting the application of the number of pulses applied to each heater of the thermal printer as a function of the set of transmittance values.

6. A method for correcting across-the-head nonuniformity in the printing of a thermal print head comprising the steps of:

(a) printing on a transparent medium with the thermal print head using equal inputs to each heating element of the thermal print head;

(b) measuring the density of print for the printing of each heating element;

(c) determining the amount of deviation of the measured density from a desired density for each heating element;

(d) computing a deviation factor from the determined amount of deviation for each heating element;

(e) storing the deviation factor for each heating element; and (f) combining the stored deviation factor associated with a heating element to the input to the heating element to provide a corrected thermal printing.

7. A method for correcting across-the-head nonuniformity in the printing of a thermal print head comprising the steps of:

(a) printing on a medium with the thermal print head using an equal number of pulse inputs to each heating element of the thermal print head;

(b) measuring the density of print for the printing of each heating element;

(c) computing a pulse correction number for each heating element according to the formula:

$$C_i = \left(\frac{D_i - D_{aim}}{\gamma}\right)\left(\frac{N_i}{N_m}\right)$$

where:

$D_i$ is the measured density for heater i;

$D_{aim}$ is the aim density;

$N_i$ is the uncorrected number of heat pulses to heater i;

$N_m$ is the number of pulses at which the original density is measured;

$\gamma$ is an adjustable parameter; and (d) correcting all further printing of each heating element by printing with the number $N_i$ where:

$$\tilde{N}_i = N_i - C_i$$

* * * * *